United States Patent
Johnson

(10) Patent No.: US 7,395,657 B2
(45) Date of Patent: Jul. 8, 2008

(54) FLADE GAS TURBINE ENGINE WITH FIXED GEOMETRY INLET

(75) Inventor: James Edward Johnson, Hamilton, OH (US)

(73) Assignee: General Electric Company, Schenectady, NY (US)

(*) Notice: Subject to any disclaimer, the term of this patent is extended or adjusted under 35 U.S.C. 154(b) by 754 days.

(21) Appl. No.: 10/689,289

(22) Filed: Oct. 20, 2003

(65) Prior Publication Data

US 2005/0081509 A1 Apr. 21, 2005

(51) Int. Cl.
*F02K 3/00* (2006.01)
*F02K 3/072* (2006.01)

(52) U.S. Cl. .................. 60/226.1; 60/226.3; 60/268; 244/53 B

(58) Field of Classification Search ............. 60/226.1, 60/226.3, 268; 244/53 B
See application file for complete search history.

(56) References Cited

U.S. PATENT DOCUMENTS

| | | | |
|---|---|---|---|
| 2,644,298 A | | 7/1953 | McLeod et al. |
| 2,940,692 A | * | 6/1960 | Kerry et al. ............... 60/262 |
| 2,956,759 A | * | 10/1960 | Creasey et al. ............ 244/53 B |
| 3,302,657 A | * | 2/1967 | Bullock ................... 244/53 B |
| 3,363,419 A | | 1/1968 | Wilde |
| 3,391,540 A | | 7/1968 | Bauger et al. |
| 3,673,802 A | | 7/1972 | Krebs et al. |
| 3,841,091 A | | 10/1974 | Sargisson et al. |
| 3,938,328 A | | 2/1976 | Klees |
| 3,986,687 A | | 10/1976 | Beavers et al. |
| 4,000,610 A | | 1/1977 | Nash et al. |

(Continued)

FOREIGN PATENT DOCUMENTS

EP 0 567 277 A1 10/1993

(Continued)

OTHER PUBLICATIONS

"A Probabilistic Approach To UCAV Engine Sizing" AIAA98-3264, Mr. Bryce Roth and Dr. Dimitri Mavris, School of Aerospace Engineering, Georgia Institute of Technology, Atlanta, GA, and Mr. Don Elliott, General Electric Aircraft Engines, Cincinnati, OH, American Institute of Aeronautics and Astronautics, 11 pages.

(Continued)

*Primary Examiner*—Ted Kim
(74) *Attorney, Agent, or Firm*—William Scott Andes; Steven J. Rosen

(57) ABSTRACT

An aircraft propulsion system includes a gas turbine engine having a fan section, at least one row of FLADE fan blades disposed radially outwardly of and drivingly connected to the fan section, the row of FLADE fan blades radially extending across a FLADE duct circumscribing the fan section, an engine inlet including a fan inlet to the fan section and an annular FLADE inlet to the FLADE duct. A fixed geometry inlet duct is in direct flow communication with the engine inlet. The fan section may include only a single direction of rotation fan or alternatively axially spaced apart first and second counter-rotatable fans in which the FLADE fan blades are drivingly connected to one of the first and second counter-rotatable fans. The row of FLADE fan blades may be disposed between rows of variable first and second FLADE vanes.

68 Claims, 7 Drawing Sheets

U.S. PATENT DOCUMENTS

| | | | |
|---|---|---|---|
| 4,000,854 A | | 1/1977 | Konarski et al. |
| 4,007,891 A | | 2/1977 | Sorensen et al. |
| 4,043,121 A | | 8/1977 | Thomas et al. |
| 4,068,471 A | | 1/1978 | Simmons |
| 4,159,624 A | * | 7/1979 | Gruner .................. 60/268 |
| 4,232,515 A | | 11/1980 | Brown |
| 4,280,660 A | | 7/1981 | Wooten, Jr. et al. |
| 4,392,615 A | | 7/1983 | Madden |
| 4,463,772 A | | 8/1984 | Ball |
| 4,587,806 A | | 5/1986 | Madden |
| 4,739,932 A | | 4/1988 | Szuminski et al. |
| 5,261,227 A | | 11/1993 | Giffin, III |
| 5,307,624 A | | 5/1994 | Even-Nur et al. |
| 5,388,964 A | | 2/1995 | Ciokajlo et al. |
| 5,402,638 A | | 4/1995 | Johnson |
| 5,402,963 A | | 4/1995 | Carey et al. |
| 5,404,713 A | | 4/1995 | Johnson |
| 5,447,283 A | * | 9/1995 | Tindell .................. 244/53 B |
| 5,806,303 A | | 9/1998 | Johnson |
| 5,809,772 A | | 9/1998 | Giffin, III et al. |
| 6,292,763 B1 | | 9/2001 | Dunbar et al. |
| 6,352,211 B1 | | 3/2002 | Bentley |

FOREIGN PATENT DOCUMENTS

| | | |
|---|---|---|
| EP | 0 646 721 B1 | 4/1995 |

OTHER PUBLICATIONS

AIAA'88, AIAA-88-3000, "Vectoring Single Expansion Ramp Nozzle (VSERN) Static Model Test Program", D.J.H. Eames, Rolls-Royce Inc., Atlanta, GA; and M.L. Mason, NASA Langley Research Center, Hampton, VA, AIAA/ASME/SAE/ASEE 24th Joint Propulsion Conference, Jul. 11-13, 1988, Boston, MA, 13 pages.

AIAA'84, AIAA-84-2455, "Single Expansion Ramp Nozzle Development Status", D.J. Dusa and W.H. Wooten, General Electric Company, Cincinnati, OH, AIAA/AHS/ASEE Aircraft Design Systems and Operations Meeting, Oct. 31-Nov. 2, 1984, San Diego, CA, 9 pages.

AIAA, AIAA 93-2429, "Static Internal Performance Tests of Single Expansion Ramp Nozzle Concepts Designed With LO Considerations", M.K. MacLean, GE Aircraft Engines, Cincinnati, OH, AIAA/SAE/ASME/ASEE 29th Joint Propulsion Conference and Exhibit, Jun. 28-30, 1993, Monterey, CA, 13 pages.

NASA/TP-1999-209138, "Experimental and Computational Investigation of a Translating-Throat, Single-Expansion-Ram Nozzle", Karen A. Deere and Scott C. Asbury, Langley Research Center, Hampton, VA, May 1999, 32 pages.

* cited by examiner

FLADE GAS TURBINE ENGINE WITH FIXED GEOMETRY INLET

BACKGROUND OF THE INVENTION

1. Field of the Invention

This invention relates to FLADE aircraft gas turbine engines and, more particularly, to such engines with fixed geometry inlet ducts.

2. Description of Related Art

High speed aircraft such as those designed to operate in the Mach 2-2.5 range typically require variable geometry inlet ducts to supply air to gas turbine engines that power the aircraft. Jet aircraft engines which are designed to operate at speeds ranging from take-off, through subsonic and transonic, and into the supersonic, require complex air inlet configurations in order to operate efficiently throughout the entire operating range. At lower subsonic speeds, particularly at take-off, it is desirable to allow the engine maximum access to air, since at these lower speeds there is no substantial "ramming" effect produced, whereby air is literally forced into the engine.

The amount of air that can be used by the engine is limited by the an inlet throat area, the throat being the point along the length of the inlet duct at which the airflow passageway is most constricted. In general, the larger the area of the inlet throat, the greater the amount of air the engine can ingest. In addition, at take-off, it is desirable to provide auxiliary airflow passageways in the inlet configuration, which have the effect of slowing the average speed of the airflow through all passageways of the inlet and, thus, preventing "sharp lip" losses (caused by separation of the airflow around the cowl lip) and "choking" of the inlet (the condition wherein the airflow through the inlet throat is sonic, i.e., Mach number=1.0, resulting in large losses in the diffusion process up to the engine inlet).

As the aircraft reaches transonic speeds, the airflow demands of the engine may also supersede the efficient supplying ability of the inlet duct because the inlet duct throat becomes choked. In the past, variable geometry inlet ducts have been designed to enlarge the minimum total cross-sectional area of the inlet duct, such as by providing auxiliary airflow passageways to the engine, in order to satisfy engine transonic airflow demand. It is well known in the art that efficient supersonic operation of the engine requires that the inlet be "started," i.e., that the internal airflow in the inlet duct be changed from subsonic to supersonic across a shock in the inlet duct, as the aircraft speed increases to supersonic speeds.

Efficient inlet ducts which operate in a mixed-compression mode are designed to control the position of the shock in the inlet during supersonic operation so that it remains substantially at the throat to minimize pressure losses across the shock and is normal to the airflow in the duct at. See U.S. Pat. No. 4,007,891 to Sorensen for background information on supersonic inlet for jet aircraft engines. U.S. Pat. No. 4,463,772 to Ball discloses a flush inlet and inlet air passage for supersonic aircraft including provisions for efficiently decelerating a supersonic airstream entering the inlet and converting such airstream to subsonic airflow within the inlet air passage prior to introduction into the aircraft's jet engine. A two-dimensional inlet and convergent/divergent inlet air passage reduces supersonic airflow entering the inlet to transonic or subsonic velocity the airflow transits the convergent portion of the inlet passage. The subsonic or transonic flow is further decelerated as it transits the divergent portion of the inlet passage prior to introduction into the aircraft's gas turbine engine. Various apparatuses are incorporated for inflight adjustment of the inlet passage boundary walls and for removing excess low energy boundary layer air from the inlet passage surfaces.

The disadvantages of variable inlet ducts and aircraft incorporating them is their complexity and their substantial weight, which can account for a considerable portion of the total engine and aircraft weight. The complexity of these systems is increased by the fact that many aircraft being designed today incorporate engines and inlet ducts completely mounted within the aircraft's fuselage or body. Thus, it is highly desirable to have a gas turbine engine with a fixed geometry inlet duct that avoids the cost, weight, and complexity of variable geometry inlet ducts. Furthermore, it is desirable to have such an engine and fixed geometry inlet duct that can operate at full and part power conditions including take-off, landing, and cruise and that can operate and cruise efficiently over a range of supersonic flight conditions such as in a range of about between Mach 2 to 2.5.

SUMMARY OF THE INVENTION

An aircraft propulsion system includes a gas turbine engine having a fan section, at least one row of FLADE fan blades disposed radially outwardly of and drivingly connected to the fan section, the row of FLADE fan blades radially extending across a FLADE duct circumscribing the fan section, an engine inlet including a fan inlet to the fan section and an annular FLADE inlet to the FLADE duct. A fixed geometry inlet duct is in direct flow communication with the engine inlet. The fan section may include only a single direction of rotation fan or, alternatively, axially spaced apart first and second counter-rotatable fans in which the FLADE fan blades are drivingly connected to one of the first and second counter-rotatable fans. The row of FLADE fan blades may be disposed between rows of variable first and second FLADE vanes.

One embodiment of the propulsion system is designed for a supersonic aircraft in which the fixed geometry inlet duct extends between an air intake mounted flush with respect to the aircraft's fuselage and the engine inlet. The FLADE engine is mounted within the fuselage. The aircraft and propulsion system with the FLADE engine and fixed geometry inlet duct avoids the cost, weight, and complexity of variable geometry inlet ducts that have been developed for supersonic aircraft. This FLADE engine and fixed geometry inlet duct can operate at full and part power conditions including take-off, landing, and can cruise efficiently over a range of supersonic flight conditions such as in a range of about between Mach 2 to 2.5.

BRIEF DESCRIPTION OF THE DRAWINGS

The foregoing aspects and other features of the invention are explained in the following description, taken in connection with the accompanying drawings where.

Figure 1:
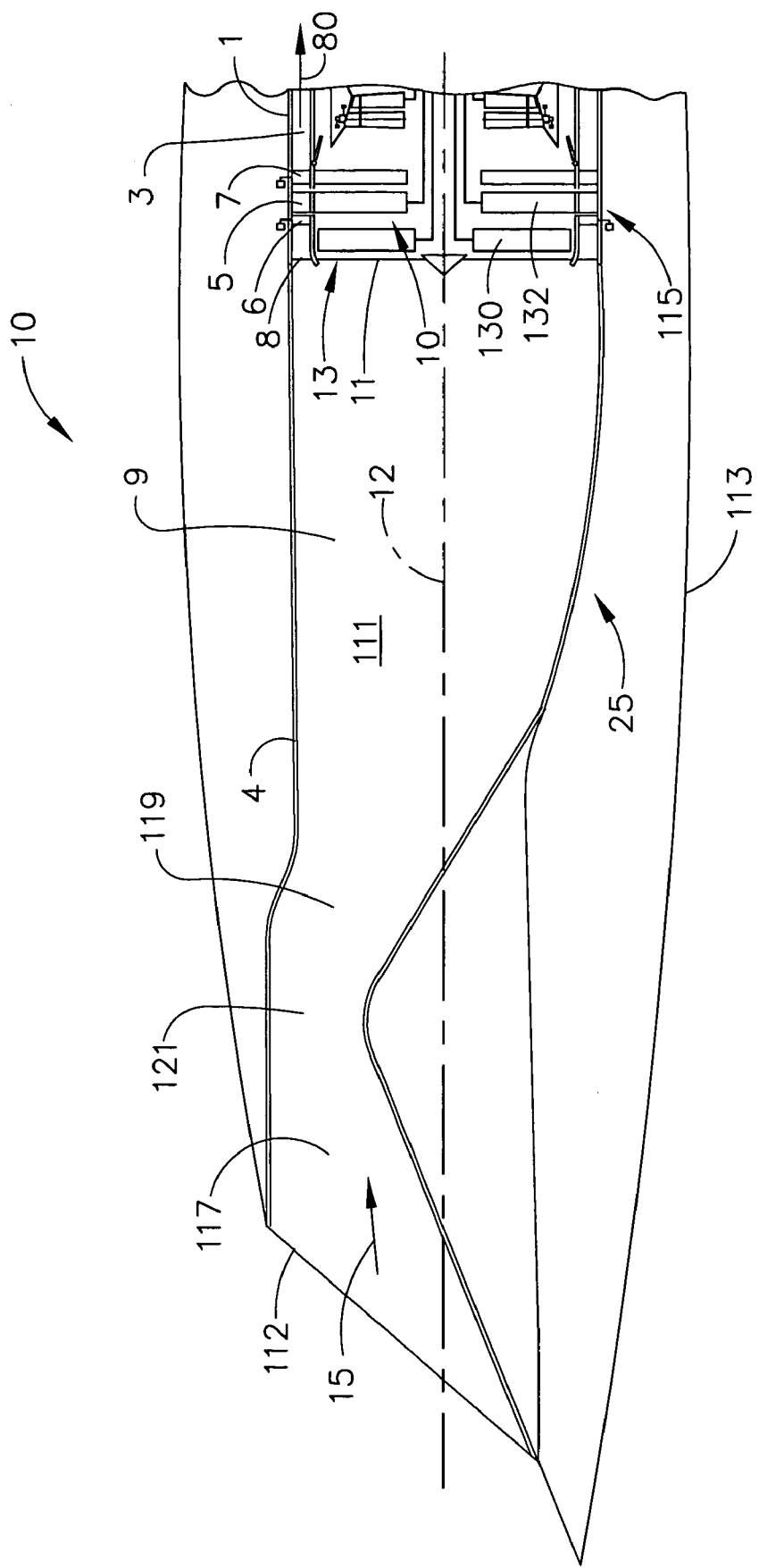
FIG. 1 is a schematical cross-sectional view illustration of a first exemplary embodiment of a fixed geometry inlet duct leading to a FLADE aircraft gas turbine engine.
Figure 2:
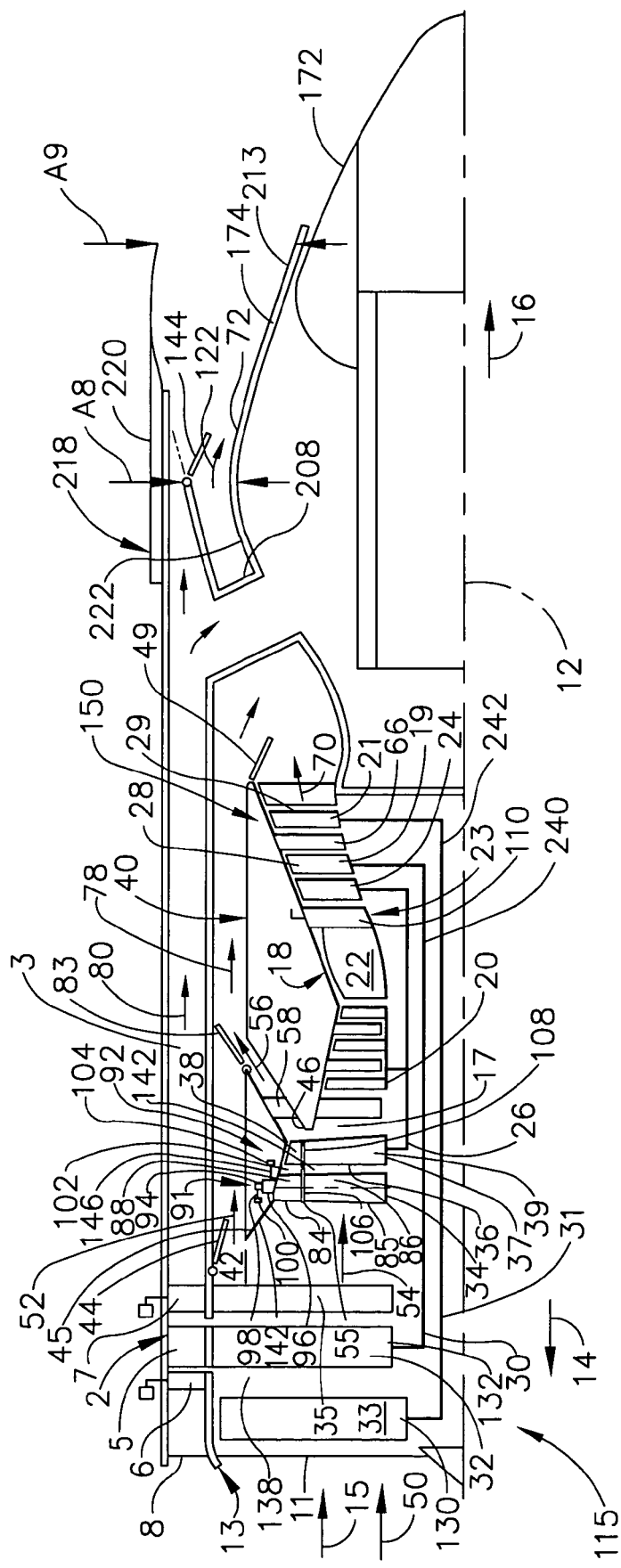
FIG. 2 is a schematical cross-sectional view illustration of the FLADE aircraft gas turbine engine in FIG. 1 with counter-rotatable first and second fans.
Figure 3:
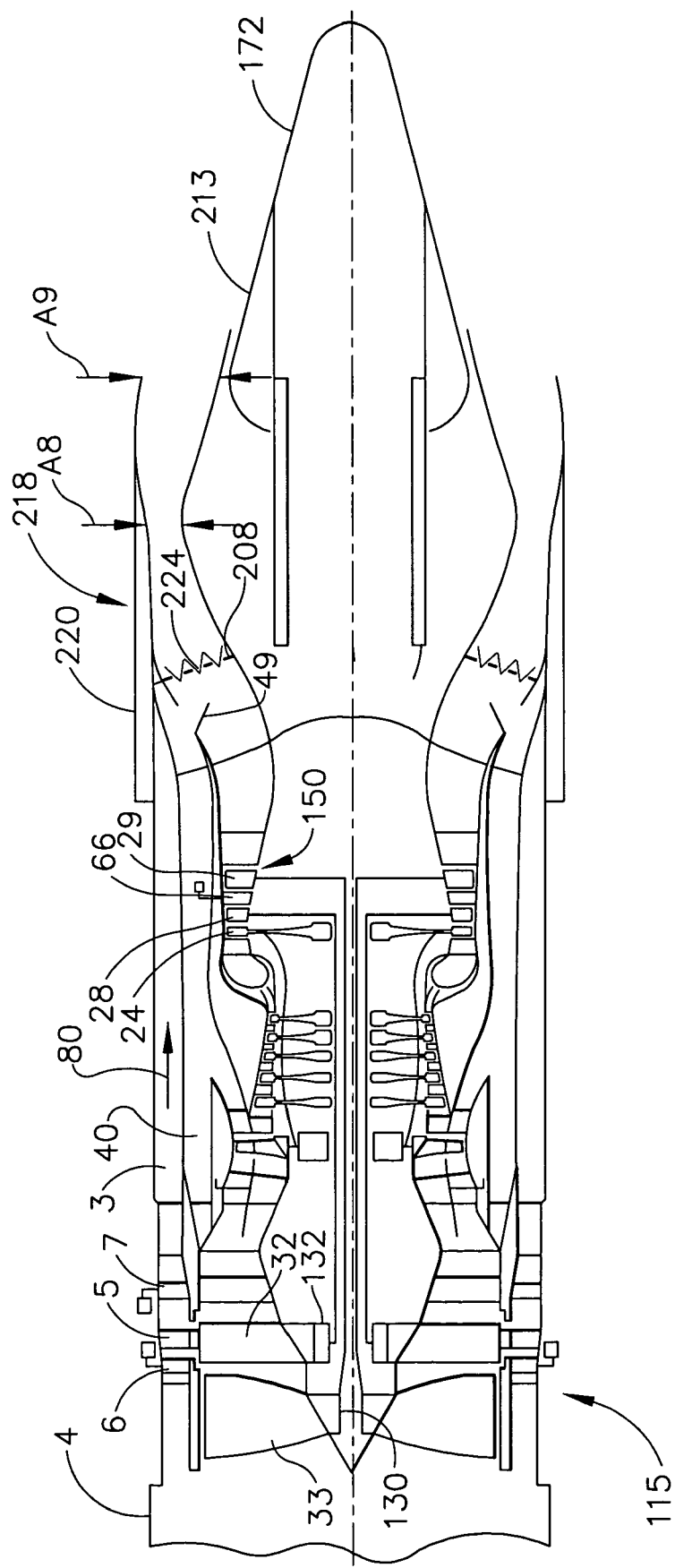
FIG. 3 is a schematical cross-sectional view illustration of the engine in FIG. 2 with a variable exhaust nozzle having a translating nozzle cowl and plug.
Figure 6:
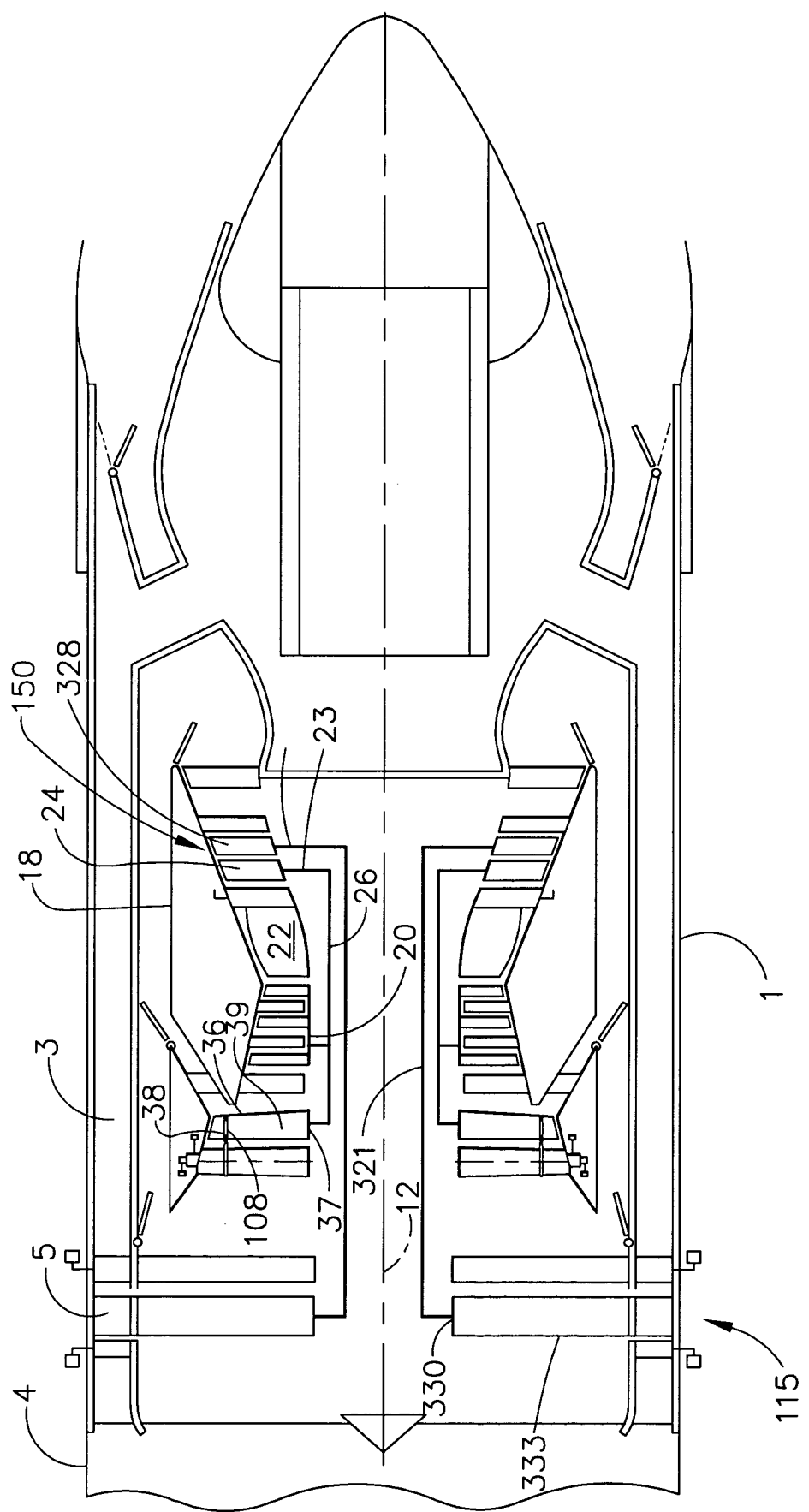
FIG. 6 is a schematical cross-sectional view illustration of a FLADE aircraft gas turbine engine with a single direction of rotation fan section connected to the fixed geometry inlet duct in FIG. 1.
Figure 7:
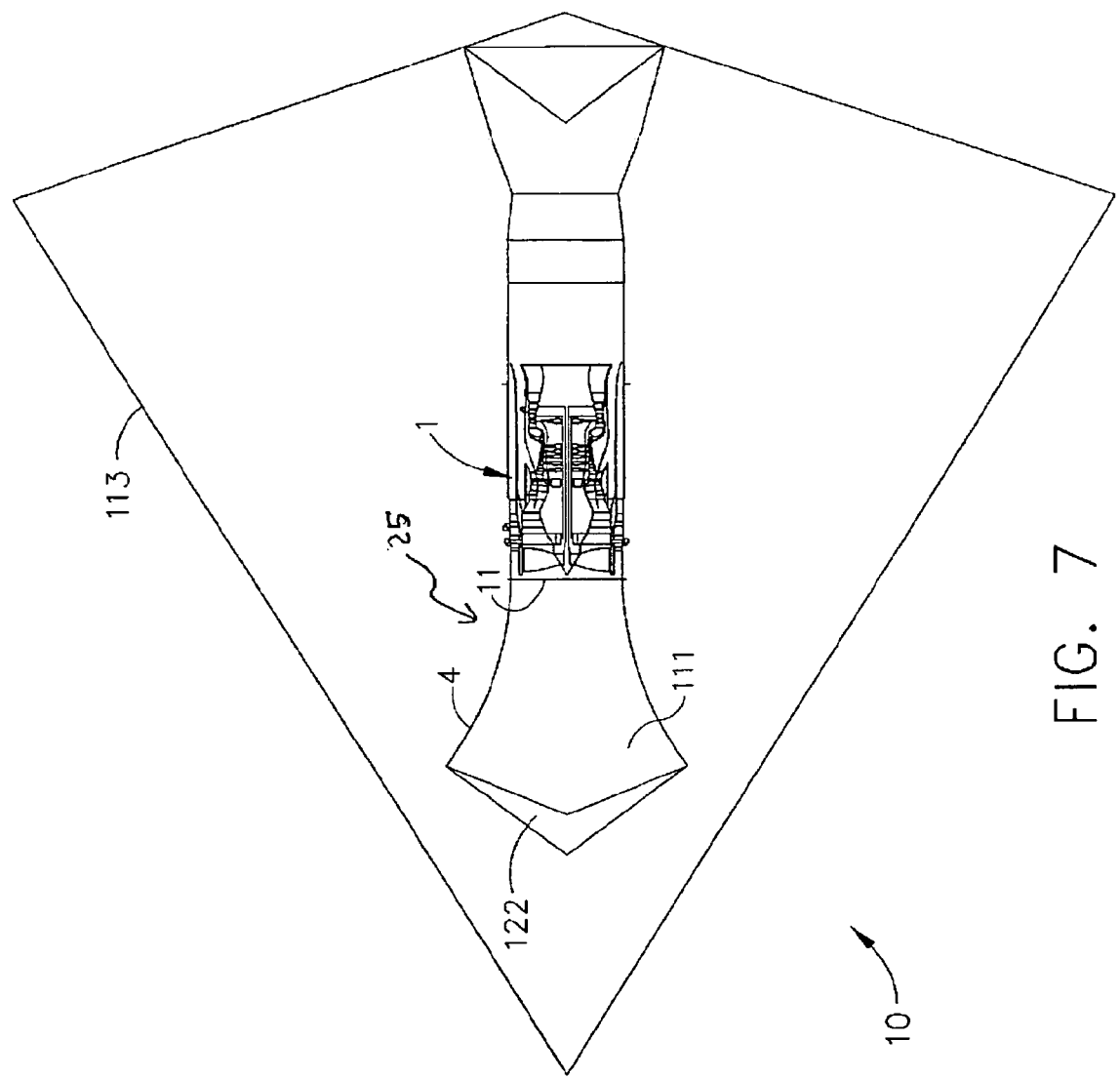
FIG. 7 is a schematical cross-sectional view illustration of an exemplary embodiment of an aircraft with the fixed geometry inlet duct leading to the FLADE aircraft gas turbine engine as illustrated in FIG. 1.

Schematically illustrated in cross-section in FIGS. 1 and 7 is a supersonic aircraft 10 having a propulsion system 25 that includes a fixed geometry inlet duct 4 leading to an aircraft FLADE engine 1 which is mounted within the aircraft's main body or fuselage 113. The embodiment of the propulsion system illustrated herein further includes a flush mounted supersonic air intake 112 to the fixed geometry inlet duct 4. The air intake 112 is mounted flush with respect to the aircraft's main body or fuselage 113. The fixed geometry inlet duct 4 extends between the air intake 112 and the engine inlet 13. The fixed geometry inlet duct 4 includes a convergent/divergent inlet duct passage 111 for supplying all of the airflow requirements of the aircraft's FLADE engine 1. The convergent/divergent inlet duct passage 111 is illustrated as, but not limited to, a convergent/divergent two-dimensional type having convergent and divergent sections 117 and 119 and a throat 121 therebetween. The fixed geometry inlet duct 4 further includes a transition section 9 between the two-dimensional convergent/divergent inlet duct passage 111 and a round asymmetric engine inlet 13 of the FLADE engine 1. The transition section 9 is shaped to convert the airflow from two-dimensional to asymmetrical airflow. Two types of aircraft FLADE engines 1 are disclosed herein. The first type is a FLADE engine 1 with a counter-rotatable fan having a fan section 115 including first and second counter-rotatable fans 130 and 132 as illustrated in FIGS. 1-3. The fan section 115 in the second type of FLADE engine 1 has only a single direction of rotation fan 330 as illustrated in FIG. 6.

A FLADE engine (FLADE being an acronym for "fan on blade") is one particular type of variable cycle engines characterized by an outer fan driven by a radially inner fan and discharging its FLADE air into an outer fan duct which is generally co-annular with and circumscribes an inner fan duct circumscribing the inner fan. One such engine, disclosed in U.S. Pat. No. 4,043,121, entitled "Two Spool Variable Cycle Engine", by Thomas et al., provides a FLADE fan and outer fan duct within which variable guide vanes control the cycle variability by controlling the amount of air passing through the FLADE outer fan duct. Other high performance aircraft variable cycle gas turbine FLADE engines capable of maintaining an essentially constant inlet airflow over a relatively wide range of thrust at a given set of subsonic flight ambient conditions such as altitude and flight Mach No. in order to avoid spillage drag and to do so over a range of flight conditions have been studied. This capability is particularly needed for subsonic part power engine operating conditions. Examples of these are disclosed in U.S. Pat. No. 5,404,713, entitled "Spillage Drag and Infrared Reducing FLADE Engine", U.S. Pat. No. 5,402,963, entitled "Acoustically Shielded Exhaust System for High Thrust Jet Engines", U.S. Pat. No. 5,261,227, entitled "Variable Specific Thrust Turbofan Engine", and European Patent No. EP0,567,277, entitled "Bypass Injector Valve For Variable Cycle Aircraft Engines". A FLADE counter-rotatable fan aircraft gas turbine engine is disclosed in U.S. patent application Ser. No. 10/647,881, filed Aug. 25, 2003, entitled "FLADE GAS TURBINE ENGINE WITH COUNTER-ROTATABLE FANS" which is incorporated herein by reference.

The FLADE fan aircraft gas turbine engine illustrated schematically in FIG. 1 includes the fan section 115 in direct fluid flow communication with the fixed geometry inlet duct 4. At least one row of FLADE fan blades 5 radially extend across a FLADE duct 3 disposed radially outwardly of and circumscribing the fan section 115. The engine inlet 13 includes a fan inlet 11 to the fan section 115 and an annular FLADE inlet 8 to the FLADE duct 3. The FLADE engine 1 with the counter-rotatable fan has a fan inlet 11 leading to first and second counter-rotatable fans 130 and 132. A FLADE fan 2 having at least one row of FLADE fan blades 5 disposed in a FLADE duct 3 through which FLADE airflow 80 is exhausted by the FLADE fan blades 5. The row of FLADE fan blades 5 is disposed radially outwardly of, operably connected to, and driven by one of the first or second counter-rotatable fans 130 and 132.

Referring to FIGS. 1 and 2, the second fan 132 is illustrated as the FLADE fan having a row of FLADE fan blades 5 disposed between an axially forward row of variable first FLADE vanes 6 and an axially aft row of variable second FLADE vanes 7. The second FLADE vanes 7 are illustrated as being variable but may be fixed. The FLADE fan 2 is disposed downstream of an annular FLADE inlet 8 to the FLADE duct 3. The FLADE inlet 8 and the fan inlet 11 in combination generally form the engine inlet 13. Referring more particularly to FIG. 2, downstream and axially aft of the first and second counter-rotatable fans 130 and 132 is a core engine 18 having an annular core engine inlet 17 and a generally axially extending axis or centerline 12 generally extending forward 14 and aft 16. A fan bypass duct 40 located downstream and axially aft of the first and second counter-rotatable fans 130 and 132 circumscribes the core engine 18. The FLADE duct 3 circumscribes the first and second counter-rotatable fans 130 and 132 and the fan bypass duct 40.

One important criterion of inlet performance is the ram recovery factor. A good inlet must have air-handling characteristics which are matched with the engine, as well as low drag and good flow stability. For a given set of operating flight conditions, the airflow requirements are fixed by the pumping characteristics of the FLADE engine 1. During supersonic operation of the engine, if the area of the engine inlet 13 is too small to handle, the inlet airflow the inlet shock moves downstream of the inlet throat 121 and pressure recovery across the shock worsens and the exit corrected flow from the inlet increases to satisfy the engine demand. If the FLADE engine inlet area is too large, the engine inlet 13 will supply more air than the engine can use resulting in excess drag (spillage drag), because we must either by-pass the excess air around the engine or "spill" it back out of the inlet. Too much air or too little air is detrimental to aircraft system performance. The FLADE fan 2 and the FLADE duct 3 are designed and operated to help manage the inlet airflow delivered by the inlet to the fans.

The fan inlet 11 is sized to receive essentially full engine airflow 15 of the engine at full power conditions with the engine inlet 13 essentially closed off by closing the variable first FLADE vanes 6 and the variable second FLADE vanes 7. The engine is further designed and operated to fully open the inlet of the FLADE duct at predetermined part power flight conditions and essentially close it at full power conditions such as take-off.

The core engine 18 includes, in downstream serial axial flow relationship, a core driven fan 37 having a row of core driven fan blades 36, a high pressure compressor 20, a combustor 22, and a high pressure turbine 23 having a row of high pressure turbine blades 24. A high pressure shaft 26, disposed coaxially about the centerline 12 of the engine 1, fixedly interconnects the high pressure compressor 20 and the high pressure turbine blades 24. The core engine 18 is effective for generating combustion gases. Pressurized air from the high pressure compressor 20 is mixed with fuel in the combustor 22 and ignited, thereby, generating combustion gases. Some work is extracted from these gases by the high pressure turbine blades 24 which drives the core driven fan 37 and the high pressure compressor 20. The high pressure shaft 26 rotates the core driven fan 37 having a single row of circumferentially spaced apart core driven fan blades 36 having generally radially outwardly located blade tip sections 38 separated from generally radially inwardly located blade hub sections 39 by an annular fan shroud 108.

The combustion gases are discharged from the core engine 18 into a low pressure turbine section 150 having counter-rotatable first and second low pressure turbines 19 and 21 with first and second rows of low pressure turbine blades 28 and 29, respectively. The second low pressure turbine 21 is drivingly connected to the first counter-rotatable fan 130 by a first low pressure shaft 30, the combination or assembly being designated a first low pressure spool 240. The first low pressure turbine 19 is drivingly connected to the second counter-rotatable fan 132 by a second low pressure shaft 31, the combination or assembly being designated a second low pressure spool 242. The second counter-rotatable fan 132 has a single row of generally radially outwardly extending and circumferentially spaced-apart second fan blades 32. The first counter-rotatable fan 130 has a single row of generally radially outwardly extending and circumferentially spaced-apart first fan blades 33. The FLADE fan blades 5 are primarily used to flexibly match inlet airflow requirements.

The row of FLADE fan blades 5 disposed in the FLADE duct 3 are illustrated as being mounted to and extend radially outwardly from the row of second fan blades 32 of the second counter-rotatable fan 132. Alternatively, the row of FLADE fan blades 5 disposed in the FLADE duct may be attached to and extend radially outwardly from the row of first fan blades 33 of the first counter-rotatable fan 130, as disclosed in U.S. patent application Ser. No. 10/647,881. The row of FLADE fan blades 5 disposed in the FLADE duct 3 may also be attached to and extend radially outwardly from a row of second stage blades of a two stage second counter-rotatable fan as disclosed in U.S. patent application Ser. No. 10/647,881.

Referring to FIGS. 2 and 3, a first bypass inlet 42 to the fan bypass duct 40 is disposed axially between the second counter-rotatable fan 132 and the annular core engine inlet 17 to the core engine 18, thereby, providing two coaxial bypass flowpaths into the fan bypass duct from the first and second counter-rotatable fans 130 and 132. The first fan blades 33 of the first counter-rotatable fan 130 and the second fan blades 32 of the second counter-rotatable fan 132 are radially disposed across the first fan duct 138. A row of circumferentially spaced-apart first fan stator vanes 35 is radially disposed across the first fan duct 138, downstream of the first and second counter-rotatable fan 130 and 132, and axially between the second counter-rotatable fan 132 and the first bypass inlet 42 to the fan bypass duct 40.

The first fan duct 138 contains the first and second counter-rotatable fans 130 and 132 including the first and second fan blades 33 and 32 and the row of circumferentially spaced-apart first fan stator vanes 35. The first fan stator vanes 35 may not be needed. The row of the core driven fan blades 36 of the core driven fan 37 are radially disposed across an annular second fan duct 142. The second fan duct 142 begins axially aft of the first bypass inlet 42 and is disposed radially inwardly of the fan bypass duct 40. An annular first flow splitter 45 is radially disposed between the first bypass inlet 42 and the second fan duct 142.

The full engine airflow 15 is split between the FLADE inlet 8 and the fan inlet 11. A fan airflow 50 passes through the fan inlet 11 and then the first and second counter-rotatable fans 130 and 132. A first bypass air portion 52 of the fan airflow 50 passes through the first bypass inlet 42 of the fan bypass duct 40 when a front variable area bypass injector (VABI) door 44 in the first bypass inlet 42 is open and with the remaining air portion 54 passing through the core driven fan 37 and its row of core driven fan blades 36.

A row of circumferentially spaced-apart core driven fan stator vanes 34 within the second fan duct 142 are disposed axially between the row of second fan blades 32 and the core driven fan blades 36 of the core driven fan 37. The row of the core driven fan stator vanes 34 and the core driven fan blades 36 of the core driven fan 37 are radially disposed across the second fan duct 142. A vane shroud 106 divides the core driven fan stator vanes 34 into radially inner and outer vane hub and tip sections 85 and 84, respectively. The fan shroud 108 divides the core driven fan blades 36 into the radially inner and outer blade hub and tip sections 39 and 38, respectively.

A second bypass airflow portion 56 is directed through a fan tip duct 146 across the vane tip sections 84 of the core driven fan stator vanes 34 and across the blade tip sections 38 of the core driven fan blades 36 into a second bypass inlet 46 of a second bypass duct 58 to the fan bypass duct 40. An optional middle variable area bypass injector (VABI) door 83 may be disposed at an aft end of the second bypass duct 58 for modulating flow through the second bypass inlet 46 to the fan bypass duct 40. An aft variable area bypass injector (VABI) door 49 is disposed at an aft end of the fan bypass duct 40 to mix bypass air 78 with core discharge air 70. The aft VABI doors 49 are circumferentially disposed between hollow struts 208 which structurally support and flow air to a hollow engine nozzle centerbody 72 and, thus, are illustrated out of plane in these FIGS.

The fan tip duct 146 includes the vane and fan shrouds 106 and 108 and a second flow splitter 55 at a forward end of the vane shroud 106. First and second varying means 91 and 92 are provided for independently varying flow areas of the vane hub and tip sections 85 and 84, respectively. Exemplary first and second varying means 91 and 92 include independently variable vane hub and tip sections 85 and 84, respectively (see U.S. Pat. No. 5,806,303). The independently variable vane hub and tip sections 85 and 84 designs may include having the entire vane hub and tip sections 85 and 84 be independently pivotable. Other possible designs are disclosed in U.S. Pat. Nos. 5,809,772 and 5,988,890.

Another embodiment of the independently variable vane hub and tip sections 85 and 84 includes pivotable trailing-edge hub and tip flaps 86 and 88 of the independently variable vane hub and tip sections 85 and 84. The first and second varying means 91 and 92 can include independently pivoting flaps. Alternative varying means for non-pivotable, fan stator vane designs include axially moving unison rings and those means known for mechanical clearance control in jet engines (i.e., mechanically moving circumferentially surrounding shroud segments radially towards and away from a row of rotor blade tips to maintain a constant clearance despite different rates of thermal expansion and contraction). Additional such varying means for non-pivotable, fan stator vane designs include those known for extending and retracting wing flaps on airplanes and the like.

Exemplary first and second varying means 91 and 92, illustrated in FIG. 2, include an inner shaft 94 coaxially disposed within an outer shaft 96. The inner shaft 94 is rotated by a first lever arm 98 actuated by a first unison ring 100. The outer shaft 96 is rotated by a second lever arm 102 actuated by a second unison ring 104. The inner shaft 94 is attached to the pivotable trailing edge hub flap 86 of the vane hub section 85 of the fan stator vane 34. The outer shaft 96 is attached to the pivotable trailing edge tip flap 88 of the vane tip section 84 of the fan stator vane 34. It is noted that the lever arms 98 and 102 and the unison rings 100 and 104 are all disposed radially outward of the fan stator vanes 34. Other such pivoting means include those known for pivoting variable stator vanes of high pressure compressors in jet engines and the like.

The row of FLADE fan blades 5 is disposed radially outward of, operably connected to, and driven by one of the first or second counter-rotatable fans 130 and 132. The axially forward row of variable first FLADE vanes 6 are used to control the amount of a FLADE airflow 80 allowed into the FLADE inlet 8 and the FLADE duct 3. Opening and closing of the FLADE duct 3 by opening and closing the first FLADE vanes 6 at part power thrust setting of the FLADE engine 1 allows the engine to maintain an essentially constant inlet airflow over a relatively wide range of thrust at a given set of subsonic flight ambient conditions such as altitude and flight Mach No. and also avoid spillage drag and to do so over a range of flight conditions. This capability is particularly needed for subsonic part power engine operating conditions. The vanes are essentially closed at a predetermined full power thrust setting of the engine. Furthermore, the FLADE inlet annular area is sized to be a fraction of an annular fan inlet area of the fan inlet 11 so that it is sufficient to receive a predetermined maximum amount of spillage air spilled from fan inlet 11. Note that additional rows of FLADE fan blades and corresponding variable FLADE vanes are also contemplated by the present invention.

The high pressure turbine 23 includes a row of high pressure turbine (HPT) nozzle stator vanes 110 which directs flow from the combustor 22 to the row of high pressure turbine blades 24. Flow from the row of high pressure turbine blades 24 is then directed into counter-rotatable second and first low pressure turbines 21 and 19 and second and first rows of low pressure turbine blades 29 and 28, respectively. A row of low pressure stator vanes 66 are disposed between the second and first rows of low pressure turbine blades 29 and 28.

A row of fixed low pressure stator vanes 66 is disposed between the second and first rows of low pressure turbine blades 29 and 28. Alternatively, a row of variable low pressure stator vanes may be incorporated between the second and first rows of low pressure turbine blades 29 and 28. The first low pressure turbine 19 and its first row of low pressure turbine blades 28 are counter-rotatable with respect to the row of high pressure turbine blades 24. The first low pressure turbine 19 and its first row of low pressure turbine blades 28 are counter-rotatable with respect to the second low pressure turbine 21 and its second row of low pressure turbine blades 29.

Referring to FIGS. 2 and 3, a variable throat area engine nozzle 218 is downstream and axially aft of the counter-rotatable second low pressure turbine 21 and the fan bypass duct 40. The engine nozzle 218 includes an axially translatable radially annular outer wall 220 spaced radially outwardly apart from a radially fixed and axially translatable convergent and divergent annular inner wall 222 on the centerbody 72. The translatable radially annular outer wall 220 controls a throat area A8 between the annular outer wall 220 and the radially fixed and axially translatable annular inner wall 222. The axially translatable annular outer wall 220 also controls a nozzle exit area A9 of the engine nozzle 218. Alternatively, a variable throat area convergent/divergent nozzle with flaps may be used as disclosed in U.S. Pat. No. 5,404,713.

The plurality of circumferentially disposed hollow struts 208 are in fluid communication with and operable to receive air from the FLADE duct 3. The hollow struts 208 structurally support and flow air to the centerbody 72 which is substantially hollow. A variable area FLADE air nozzle 213 includes an axially translatable plug 172 which cooperates with a radially outwardly positioned fixed nozzle cowling 174 of the centerbody 72 to exhaust FLADE airflow 80 received from the hollow struts 208 to return work to the engine in the form of thrust. Optionally, a second portion of FLADE airflow 80 may be injected into the exhaust flow 122 through an aft FLADE variable area bypass injector door 144.

Figure 4:
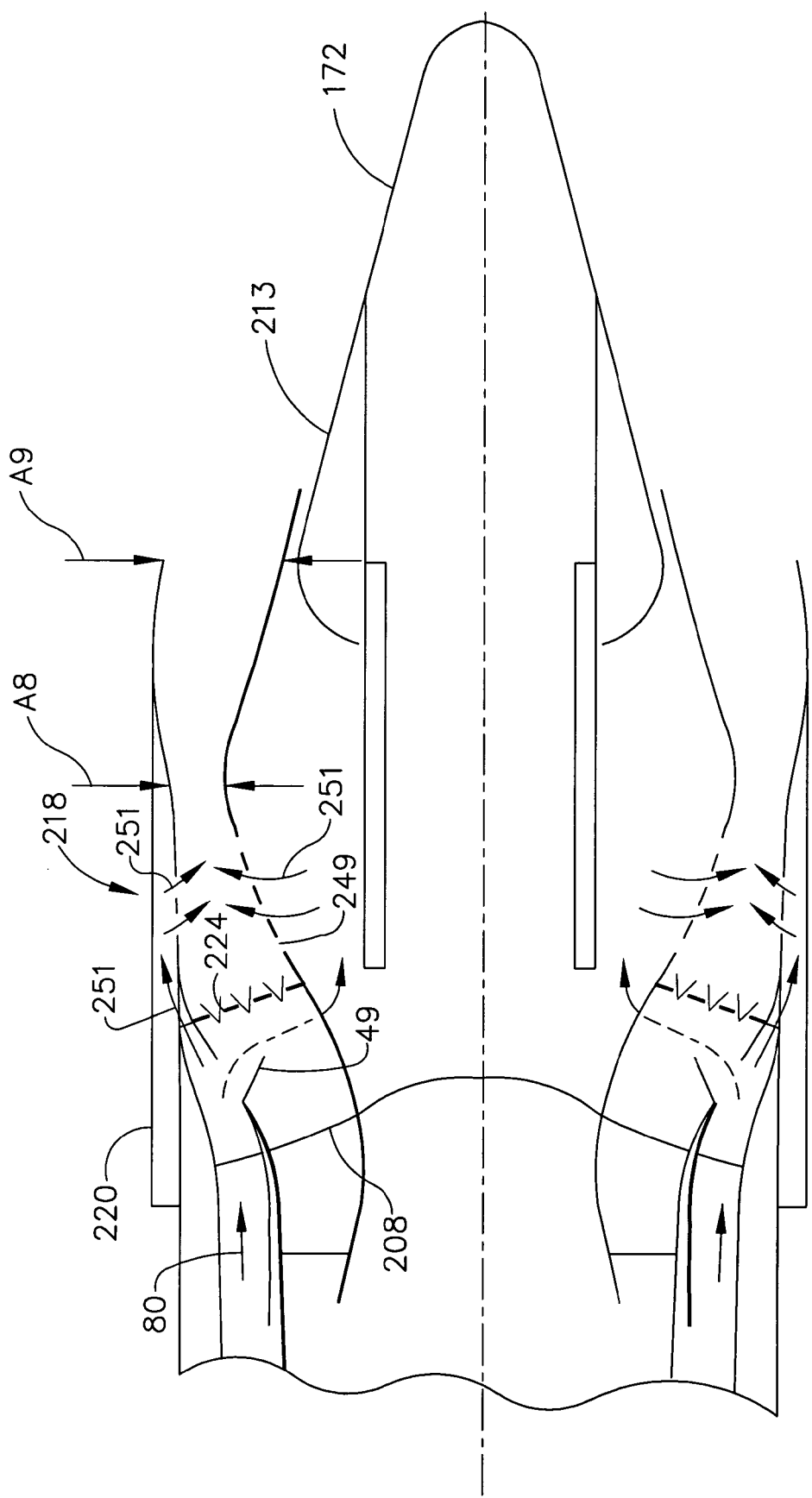
FIG. 4 is a schematical cross-sectional view illustration of a coolable nozzle in the engine in FIG. 3.

FIG. 4 illustrates a nozzle cooling arrangement in which at least some of the FLADE airflow 80 is used as cooling air 251 which flowed through the hollow struts 208 into the substantially hollow centerbody 72. The cooling air 251 is then flowed through cooling apertures 249 in the centerbody 72 to cool the centerbody. Some of the FLADE airflow 80 may also be used as cooling air 251 for cooling the radially annular outer wall 220 of the engine nozzle 218 in the same manner. Cooling of the annular outer wall 220 and the hollow centerbody 72 is particularly important when thrust augmenters or afterburners 224 aft and downstream of the low pressure turbine section 150 are ignited. The apertures may be angled to provide film cooling along the centerbody 72 and/or the hollow struts 208. Holes, shaped and angled holes, and slots and angled slots are among the types of cooling apertures 249 that may be used.

Referring again to FIGS. 2 and 3, a major goal of counter-rotating fan engines is to eliminate the stator vanes in the fan section of the engine. A second goal is to minimize the number of nozzles or vanes in the turbine. The savings in weight and cost due to the removal of the fan stator vanes is traded against the complexity of adding a third spool, namely one of the first and second counter-rotating low pressure spools. Counter-rotating fan engines typically have a wheel speed of the second counter-rotatable fan 132 that is somewhat lower than that of the first counter-rotatable fan 130. This is one reason for selecting the second counter-rotatable fan 132 upon which to mount the row of FLADE fan blades 5.

An elevated relative Mach number into second counter-rotatable fan 132 is the reason for its lower wheel speed and it is a result of the counter-swirl imparted by the first counter-rotatable fan 130. The lower wheel speed of the second counter-rotatable fan 132 suggests a reduced work fraction on it to equalize the net fan rotor torque. In this manner, the exit swirl from the second counter-rotatable fan 132 is sufficiently small so no downstream straightening vanes are required.

One exemplary speed ratio of the second counter-rotatable fan 132 to the first counter-rotatable fan 130, (speed of rotor 2/speed of rotor 1), is 0.75 which also the work ratio of the two fans. The resulting work split is 57.5% for the first counter-rotatable fan 130 and the remaining 42.5% for the second counter-rotatable fan 132. Current studies suggest that energy requirements of the row of FLADE fan blades 5 is in a range of 15 to 30 percent of the overall fan energy.

One problem with counter-rotatable fans is an area ratio requirement across the first low pressure turbine 19. Prudent design practice suggests little or no outward slope over the turbine rotor to lessen turbine blade tip clearance migrations with the axial migration of the turbine rotor. Design practice also constrains turbine blade hub slope to less that about 30 degrees to avoid excessive aerodynamic loss in this region. It is desirable to avoid first low pressure turbines having rotor pressure ratios in excess of about 1.45. Turbines rotor pressure ratio is defined turbine blade inlet pressure divided by turbine blade exit pressure. Prior counter-rotatable fan engine designs indicate that first low pressure turbines have pressure ratios of about 1.9. This is far more than what is desirable.

The total work on the second low pressure spool 242 is the sum of the work performed by the second counter-rotatable fan 132 plus the work performed by have the FLADE fan blades 5. The total work extracted by the first low pressure turbine 19, which is drivingly connected to the second counter-rotatable fan 132, requires a first low pressure turbine 19 pressure ratio well in excess of the above noted limit for a no turbine nozzle configuration. A solution to this problem is to reduce the work requirement of the second counter-rotatable fan 132 to a point consistent with a first low pressure turbine 19 pressure ratio of about 1.45.

The reduced work of the second counter-rotatable fan 132 is then added to the work required by first counter-rotatable fan 130, thereby, restoring the total fan work. Adequate fan stall margin must be retained with the revised stage pressure ratio requirements. Rotor speeds of the first and second counter-rotatable fans 130 and 132 are determined by their respective pressure ratio requirements. The rotor speed of the second counter-rotatable fan 132 is determined by its pressure ratio requirement or alternatively by the pressure ratio requirement of the FLADE fan blades 5. The resulting work ratio for the second counter-rotatable fan 132 in the engine illustrated in FIGS. 1-3 is about 0.43 and its speed ratio is about 0.73.

The FLADE airflow 80 may be modulated using the variable first FLADE vanes 6 to provide maximum engine airflow capability at take-off operating conditions for noise abatement or for engine inlet airflow matching during flight. At supersonic cruise conditions the FLADE airflow may be reduced to its least energy absorbing airflow to permit the highest attainable specific thrust. The FLADE airflow modulation may alter the work requirement of the first low pressure turbine 19 of the second low pressure spool 242. However, the first low pressure turbine 19 and its first row of low pressure turbine blades 28 is nested between the row of high pressure turbine blades 24 of the high pressure turbine 23 and the second low pressure turbine 21 and its second row of low pressure turbine blades 29.

The first low pressure turbine 19 inlet flow function is expected to remain relatively constant over its steady state operating space. The second low pressure turbine 21 inlet flow function is also expected to remain relatively constant over its steady state operating regime. Accordingly, the pressure ratio of the first low pressure turbine 19 is expected to remain relatively constant. At constant pressure ratio the work output of the first low pressure turbine 19 will remain relatively constant. This constant work output of the first low pressure turbine 19 coupled with the reduced work input requirement of the first low pressure spool 240, due to closure of the variable first FLADE vanes 6 and the row of FLADE fan blades 5 would create a torque imbalance and cause an acceleration of the low pressure spool 240.

The pressure ratio across the first low pressure turbine 19 must be modulated to prevent this excess torque. The modulation is accomplished by varying the row of variable low pressure stator vanes 66 between the first and second rows of low pressure turbine blades 28 and 29 to adjust inlet flow to the second row of low pressure turbine blades 29. A variable throat area A8 helps to avoid over extraction by the first low pressure turbine 19.

Figure 5:
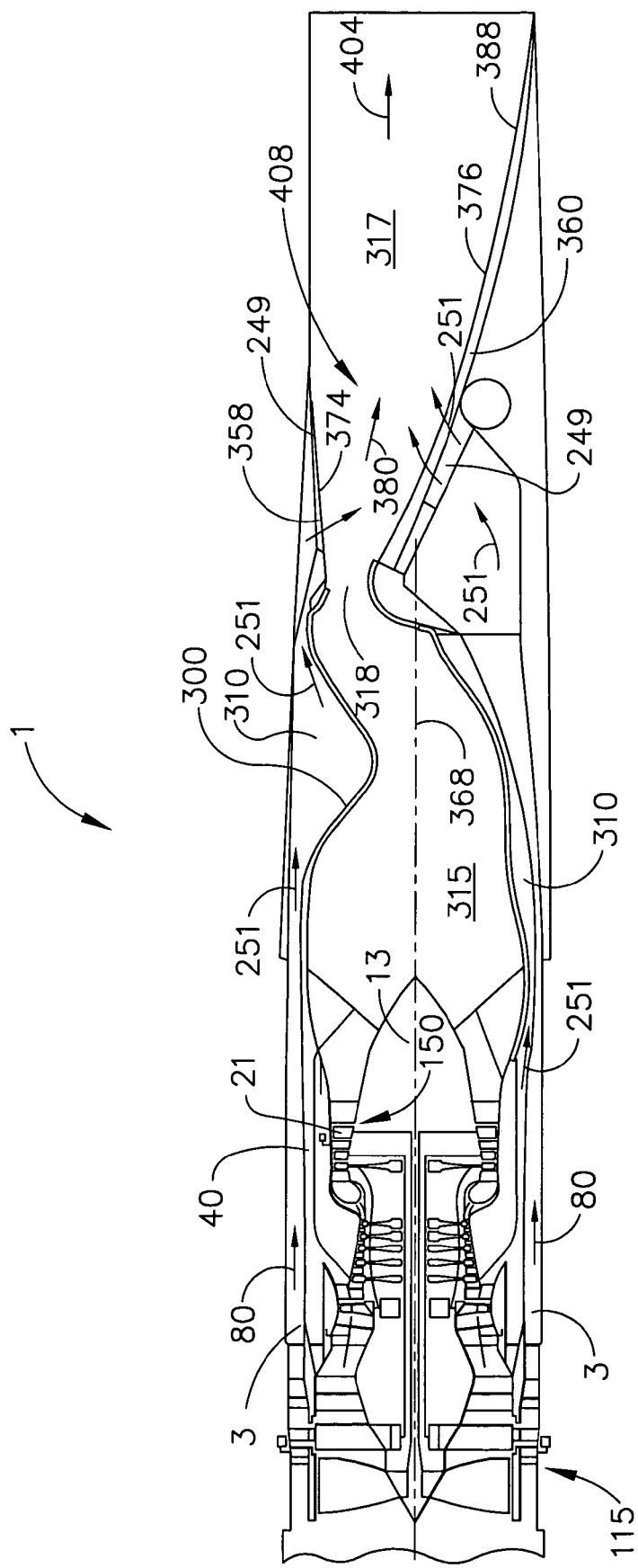
FIG. 5 is a schematical cross-sectional view the engine in FIG. 3 with a single expansion ramp nozzle.

Illustrated in FIG. 5 is the FLADE engine 1 with the FLADE counter-rotatable fan and one type of two-dimensional nozzle referred to as a single expansion ramp nozzle 300 or SERN nozzle downstream and axially aft of the counter-rotatable second low pressure turbine 21 and the fan bypass duct 40. SERN nozzles were developed as a variable area non-asymmetric nozzles with a unique installed performance characteristic of low weight and frictional drag because there is no or a smaller lower cowl. SERN nozzles also provide Low Observable (LO) exhaust nozzle technology which is being developed for current and future fighter/attack aircraft. LO nozzles should be integrated cleanly with the aircraft airframe and not degrade the aircraft's performance due to weight and drag penalties. Exhaust systems for combat aircraft should possess characteristics to enhance aircraft survivability, including high internal performance, reduced radar cross-section (RCS), low infrared (IR) signatures, low installed weight, low installation drag and, in some cases, thrust-vectoring capabilities.

Two-dimensional nozzles have been developed for the purpose of accomplishing thrust vectoring. Two-dimensional vectorable exhaust nozzles incorporate upper and lower flaps that are angled simultaneously for the purpose of deflecting exhaust gas in an upward or downward direction. Increasing the angle of the flaps increases the amount of turning that is imparted to the exhaust gas flow.

The augmenter includes an exhaust casing and liner therein which defines a combustion zone. Fuel spraybars and flameholders are mounted between the turbines and the exhaust nozzle for injecting additional fuel when desired during reheat operation for burning in the augmenter for producing additional thrust. In a bypass turbofan engine, an annular bypass duct extends from the fan to the augmenter for bypassing a portion of the fan air around the core engine to the augmenter. The bypass air is used in part for cooling the exhaust liner and also is mixed with the core gases prior to discharge through the exhaust nozzle. Turbojets, engines without bypass ducts may also use augmenters and variable area two-dimensional nozzles.

Various types of flameholders are known and typically include radial and circumferential V-shaped gutters which provide local low velocity recirculation and stagnation regions therebehind, in otherwise high velocity core gas flow, for sustaining combustion during reheat operation. Since the core gases are the product of combustion in the core engine, they are initially hot when they leave the turbine, and are further heated when burned with the bypass air and additional fuel during reheat operation.

The hot parts of the engine visible along lines of sight through the exhaust nozzle produce an infrared signal or signature. The rotating turbine has a radar detectable signature or radar cross-section (RCS). A SERN nozzle may be used to reduce the engine's radar cross-section and suppress and masking infrared (IR) emissions through engine exhaust ducts particularly those due to turbine and augmenter parts. Successful operation of combat aircraft is dependent, in part, upon the ability of the aircraft to remain undetected by infrared sensors and radars of missiles during flight. The high temperatures of the engine's exhaust gases and the hot metal turbine parts and the hot metal walls directly in contact with the hot gases cause the engine to emit high levels of infrared energy. Military aircraft engaged in combat are vulnerable to anti-aircraft missiles employing highly sophisticated infrared sensors and radar. At least some of the FLADE airflow 80 may be flowed as cooling air 251 to at least one internal cavity 310 of the single expansion ramp nozzle 300 or SERN nozzle to be used for internal cooling and/or film cooling over hot surfaces of the nozzle as illustrated in FIG. 5.

The SERN nozzle 300 is a convergent divergent two-dimensional gas turbine engine exhaust nozzle. The nozzle 300 is a convergent/divergent nozzle illustrated as having convergent and divergent sections 315 and 317 and a variable area throat 318 therebetween. The divergent section 317 includes transversely spaced apart upper and lower divergent flaps 358 and 360, respectively, extending longitudinally downstream along a nozzle axis 368 and disposed between two widthwise spaced apart first and second sidewalls not illustrated herein. The nozzle axis 368 in the exemplary embodiment is collinear with the longitudinal centerline 12 but need not be in other embodiments or applications of the engine.

The nozzle is described in terms of upper and lower elements and upward and downward directions. This is for purpose of convenience and upper and lower flaps and other elements may be reversed. There are embodiments of the nozzle wherein the nozzle installation is upside down with respect to the embodiments illustrated herein. The choice of upper and lower is for ease of description.

The upper and lower divergent flaps 358 and 360 have inwardly facing upper and lower flap surfaces 374 and 376, respectively, which together with the sidewalls define, at least a part, an exhaust stream flowpath 380 therebetween. The lower divergent flap 360 has an expansion ramp 388 diverging away from the nozzle axis 368. The upper and lower divergent flaps 358 and 360 have cooling apertures 249 through which at least some of the FLADE airflow 80 may be flowed as cooling air 251 over the upper and lower flap surfaces 374 and 376, respectively. The apertures are illustrated as being in fluid receiving communication with the internal cavity 310 and may be angled to provide film cooling along the surfaces.

The upper and lower divergent flaps 358 and 360 are rotatable about in order to provide the nozzle 300 with the ability to vector the thrust of the engine by vectoring an exhaust flow 404 out of the nozzle. The upper and lower divergent flaps 358 and 360 are movable to block a line of sight along the nozzle axis 368 through a nozzle exit 408 of the nozzle during engine operation. The divergent flaps may be positioned to block a range of lines of sight through the nozzle exit at acute angles to the nozzle axis. The upper divergent flap 358 is generally flat or convex and the lower divergent flap 360 is generally concave.

The fan section 115 in the engine illustrated in FIG. 6 has only a single direction of rotation fan 330 and the fan section 115 is in direct fluid flow communication with the fixed geometry inlet duct 4. The row of FLADE fan blades 5 radially extend across the FLADE duct 3 disposed radially outwardly of and circumscribing the fan section 115. The row of FLADE fan blades 5 is disposed radially outwardly of, operably connected to, and driven by the single direction of rotation fan 330. The core engine 18 includes, in downstream serial axial flow relationship, a core driven fan 37 having a row of core driven fan blades 36, a high pressure compressor 20, a combustor 22, and a high pressure turbine 23 having a row of high pressure turbine blades 24. A high pressure shaft 26, disposed coaxially about the centerline 12 of the engine 1, fixedly interconnects the high pressure compressor 20 and the high pressure turbine blades 24. The core engine 18 is effective for generating combustion gases. Pressurized air from the high pressure compressor 20 is mixed with fuel in the combustor 22 and ignited, thereby, generating combustion gases. Some work is extracted from these gases by the high pressure turbine blades 24 which drives the core driven fan 37 and the high pressure compressor 20. The high pressure shaft 26 rotates the core driven fan 37 having a single row of circumferentially spaced apart core driven fan blades 36 having generally radially outwardly located blade tip sections 38 separated from generally radially inwardly located blade hub sections 39 by an annular fan shroud 108.

The combustion gases are discharged from the core engine 18 into the low pressure turbine section 150 which has a single direction of rotation low pressure turbine 319 having at least one row of low pressure turbine blades 328. The low pressure turbine 319 is drivingly connected to the single direction of rotation fan 330 by a low pressure shaft 321. The single direction of rotation fan 330 has at least one row of generally radially outwardly extending and circumferentially spaced-apart fan blades 333. The FLADE fan blades 5 are primarily used to used to flexibly match inlet airflow requirements.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. An aircraft propulsion system comprising:
   a gas turbine engine comprising;
   a fan section,
   at least one row of FLADE fan blades disposed radially outwardly of and drivingly connected to the fan section,
   the row of FLADE fan blades radially extending across a FLADE duct circumscribing the fan section,
   an engine inlet including a fan inlet to the fan section and an annular FLADE inlet to the FLADE duct, and
   a fixed geometry inlet duct in direct flow communication with the engine inlet.

2. A propulsion system as claimed in claim 1 wherein the fan section includes only a single direction of rotation fan.

3. A propulsion system as claimed in claim 1 wherein the fan section is upstream of a fan bypass duct, includes axially spaced apart first and second counter-rotatable fans, and the FLADE fan blades are drivingly connected to one of the first and second counter-rotatable fans.

4. A propulsion system as claimed in claim 1 further comprising a row of variable first FLADE vanes disposed axially forwardly of the row of FLADE fan blades.

5. A propulsion system as claimed in claim 4 wherein the fan section includes only a single direction of rotation fan.

6. A propulsion system as claimed in claim 4 wherein the fan section is upstream of a fan bypass duct, includes axially spaced apart first and second counter-rotatable fans, and the FLADE fan blades are drivingly connected to one of the first and second counter-rotatable tans.

7. A propulsion system as claimed in claim 1 further comprising the row of FLADE fan blades disposed between an axially forward row of variable first FLADE vanes and an axially aft row of second FLADE vanes.

8. A propulsion system as claimed in claim 1 further comprising:
   a core engine located downstream and axially aft of the fan,
   a fan bypass duct located downstream and axially aft of the fan and circumscribing the core engine, and
   the FLADE duct circumscribing the fan bypass duct.

9. A propulsion system as claimed in claim 8 wherein the fan section includes only a single direction of rotation fan.

10. A propulsion system as claimed in claim 8 wherein the fan section is upstream of the fan bypass duct, includes axially spaced apart first and second counter-rotatable fans, and the FLADE fan blades are drivingly connected to one of the first and second counter-rotatable fans.

11. A propulsion system as claimed in claim 8 further comprising a row of variable first FLADE vanes disposed axially forwardly of the row of FLADE fan blades.

12. A propulsion system as claimed in claim 11 wherein the fan section is upstream of the fan bypass duct, includes axially spaced apart first and second counter-rotatable fans, and the FLADE fan blades are drivingly connected to one of the first and second counter-rotatable fans.

13. A propulsion system as claimed in claim 12 further comprising:
the core engine having in serial flow relationship a row of core driven fan stator vanes, a core driven fan with at least one row of core driven fan blades, a high pressure compressor, a combustor, and a high pressure turbine drivingly connected to the core driven fan,
the first and second counter-rotatable fans are radially disposed across an annular first fan duct,
first and second low pressure turbines drivingly connected to the first and second counter-rotatable fans,
the core driven fan is radially disposed across an annular second fan duct.
a vane shroud dividing the core driven fan stator vanes into radially inner and outer vane hub and tip sections,
a fan shroud dividing the core driven fan blades into radially inner and outer blade hub and tip sections,
a first bypass inlet to the fan bypass duct is disposed axially between the second counter-rotatable fan and the annular core engine inlet to the core engine,
a fan tip duct across the vane tip sections of the core driven fan stator vanes and across the blade tip sections of the core driven fan blades extending to a second bypass inlet to the fan bypass duct, and
a first varying means for independently varying a flow area of the vane tip section.

14. A propulsion system as claimed in claim 13 further a second varying means for independently varying a flow area of the vane hub section.

15. A propulsion system as claimed in claim 14 wherein the first and second varying means include independently varying vane tip sections and independently varying vane hub sections respectively.

16. A propulsion system as claimed in claim 15 further comprising a front variable area bypass injector door in the first bypass inlet.

17. A propulsion system as claimed in claim 13 further comprising:
the row of FLADE fan blades disposed radially outwardly of and drivingly connected to the second counter-rotatable fan,
the high pressure turbine having a row of high pressure turbine nozzle stator vanes axially located between the combustor and a row of high pressure turbine blades of the high pressure turbine,
the row of high pressure turbine blades being counter-rotatable to the first low pressure turbine,
a row of variable low pressure stator vanes between first and second rows of low pressure turbine blades of the first and second low pressure turbines respectively, and
the row of high pressure turbine nozzle stator vanes, the row of high pressure turbine blades, the first row of low pressure turbine blades, the row of variable low pressure stator vanes, and the second row of low pressure turbine blades being in serial axial and downstream relationship.

18. A propulsion system as claimed in claim 13 further comprising:
the high pressure turbine having a row of high pressure turbine nozzle stator vanes axially located between the combustor and a row of high pressure turbine blades of the high pressure turbine,
the row of high pressure turbine blades being counter-rotatable to the first low pressure turbine,
a row of fixed stator vanes between the row of high pressure turbine blades and the first low pressure turbine,
no vanes between the first and second rows of low pressure turbine blades of the first and second low pressure turbines respectively, and
the row of high pressure turbine nozzle stator vanes, the row of high pressure turbine blades, the row of fixed stator vanes, the first row of low pressure turbine blades, and the second row of low pressure turbine blades being in serial axial and downstream relationship.

19. A propulsion system as claimed in claim 13 further comprising:
the second counter-rotatable fan having axially spaced apart rows of first and second stage blades and a row of second stage fan vanes therebetween,
the row of FLADE fan blades disposed radially outwardly of and drivingly connected to the row of second stage blades,
the high pressure turbine having a row of high pressure turbine nozzle stator vanes axially located between the combustor and a row of high pressure turbine blades of the high pressure turbine,
the row of high pressure turbine blades being counter-rotatable to the first low pressure turbine,
a row of fixed stator vanes between the row of high pressure turbine blades and the first low pressure turbine.
no vanes between the first and second rows of low pressure turbine blades of the first and second low pressure turbines respectively, and
the row of high pressure turbine nozzle stator vanes, the row of high pressure turbine blades, the row of fixed stator vanes, the first row of low pressure turbine blades, and the second row of low pressure turbine blades being in serial axial and downstream relationship.

20. A propulsion system as claimed in claim 13 further comprising:
the second counter-rotatable fan having axially spaced apart rows of first and second stage blades and a row of second stage fan vanes therebetween,
the row of FLADE fan blades disposed radially outwardly of and drivingly connected to the row of second stage blades,
the high pressure turbine having a row of high pressure turbine nozzle stator vanes axially located between the combustor and a row of high pressure turbine blades of the high pressure turbine,
the row of high pressure turbine blades being counter-rotatable to the first low pressure turbine,
a row of variable low pressure stator vanes between first and second rows of low pressure turbine blades of the first and second low pressure turbines respectively, and
the row of high pressure turbine nozzle stator vanes, the row of high pressure turbine blades, the first row of low pressure turbine blades, the row of variable low pressure stator vanes, and the second row of low pressure turbine blades being in serial axial and downstream relationship.

21. A propulsion system as claimed in claim 8 further comprising the row of FLADE fan blades disposed between an axially forward row of variable first FLADE vanes and an axially aft row of second FLADE vanes.

22. A propulsion system as claimed in claim 21 wherein the fan section includes only a single direction of rotation fan.

23. A propulsion system as claimed in claim 8 further comprising a single expansion ramp nozzle downstream of and in fluid receiving communication with the core engine and the fan bypass duct wherein at least one internal cavity of the single expansion ramp nozzle is in fluid cooling flow communication with the FLADE duct.

24. A propulsion system as claimed in claim 23 wherein the fan section includes only a single direction of rotation fan.

25. A propulsion system as claimed in claim 23 wherein the fan section is upstream of the fan bypass duct, includes axially spaced apart first and second counter-rotatable fans, and the FLADE fan blades are drivingly connected to one of the first and second counter-rotatable fans.

26. A propulsion system as claimed in claim 23 further comprising a row of variable first FLADE vanes disposed axially forwardly of the row of FLADE fan blades.

27. A propulsion system as claimed in claim 26 wherein the fan section includes only a single direction of rotation fan.

28. A propulsion system as claimed in claim 26 wherein the fan section is upstream of the fan bypass duct, includes axially spaced apart first and second counter-rotatable fans, and the FLADE fan blades are drivingly connected to one of the first and second counter-rotatable fans.

29. A propulsion system as claimed in claim 23 further comprising the row of FLADE fan blades disposed between an axially forward row of variable first FLADE vanes and an axially aft row of second FLADE vanes.

30. A propulsion system as claimed in claim 23 further comprising:
a core engine located downstream and axially aft of the fan,
a fan bypass duct located downstream and axially aft of the fan and circumscribing the core engine, and
the FLADE duct circumscribing the fan bypass duct.

31. A propulsion system as claimed in claim 30 wherein the fan section includes only a single direction of rotation fan.

32. A propulsion system as claimed in claim 30 wherein the fan section is upstream of the fan bypass duct, includes axially spaced apart first and second counter-rotatable fans, and the FLADE fan blades are drivingly connected to one of the first and second counter-rotatable fans.

33. A propulsion system as claimed in claim 30 further comprising a row of variable first FLADE vanes disposed axially forwardly of the row of FLADE fan blades.

34. A propulsion system as claimed in claim 33 wherein the fan section is upstream of the fan bypass duct, includes axially spaced apart first and second counter-rotatable fans, and the FLADE fan blades are drivingly connected to one of the first and second counter-rotatable fans.

35. A propulsion system as claimed in claim 34 further comprising:
the core engine having in serial flow relationship a row of core driven fan stator vanes, a core driven fan with at least one row of core driven fan blades, a high pressure compressor, a combustor, and a high pressure turbine drivingly connected to the core driven fan,
the first and second counter-rotatable fans and are radially disposed across an annular first fan duct,
the core driven fan is radially disposed across an annular second fan duct,
a vane shroud dividing the core driven fan stator vanes into radially inner and outer vane hub and tip sections,
a fan shroud dividing the core driven fan blades into radially inner and outer blade hub and tip sections,
a first bypass inlet to the fan bypass duct is disposed axially between the second counter-rotatable fan and the annular core engine inlet to the core engine,
a fan tip duct across the vane tip sections of the core driven fan stator vanes and across the blade tip sections of the core driven fan blades extending to a second bypass inlet to the fan bypass duct, and
a first varying means for independently varying a flow area of the vane tip section.

36. A propulsion system as claimed in claim 35 further a second varying means for independently varying a flow area of the vane hub section.

37. A propulsion system as claimed in claim 36 wherein the first and second varying means include independently varying vane tip sections and independently varying vane hub sections respectively.

38. A propulsion system as claimed in claim 37 further comprising a front variable area bypass injector door in the first bypass inlet.

39. A propulsion system as claimed in claim 30 further comprising the row of FLADE fan blades disposed between an axially forward row of variable first FLADE vanes and an axially aft row of second FLADE vanes.

40. A propulsion system as claimed in claim 39 wherein the fan section includes only a single direction of rotation fan.

41. A propulsion system as claimed in claim 1 further comprising the fixed geometry inlet duct having a two-dimensional convergent/divergent inlet duct passage with convergent and divergent sections, and a throat therebetween and a transition section between the two-dimensional convergent/divergent inlet duct passage and the engine inlet.

42. A propulsion system as claimed in claim 41 wherein the fan section includes only a single direction of rotation fan.

43. A propulsion system as claimed in claim 41 wherein the fan section is upstream of a fan bypass duct, includes axially spaced apart first and second counter-rotatable fans, and the FLADE fan blades are drivingly connected to one of the first and second counter-rotatable fans.

44. A propulsion system as claimed in claim 41 further comprising a row of variable first FLADE vanes disposed axially forwardly of the row of FLADE fan blades.

45. A propulsion system as claimed in claim 44 wherein the fan section includes only a single direction of rotation fan.

46. A propulsion system as claimed in claim 44 wherein the fan section is upstream of a fan bypass duct, includes axially spaced apart first and second counter-rotatable fans, and the FLADE fan blades are drivingly connected to one of the first and second counter-rotatable fans.

47. A propulsion system as claimed in claim 41 further comprising the row of FLADE fan blades disposed between an axially forward row of variable first FLADE vanes and an axially aft row of second FLADE vanes.

48. An aircraft comprising:
a gas turbine engine within a fuselage of the aircraft,
the gas turbine engine comprising;
a fan section,
at least one row of FLADE fan blades disposed radially outwardly of and drivingly connected to the fan section,
the row of FLADE fan blades radially extending across a FLADE duct circumscribing the fan section, and
an engine inlet including a fan inlet to the fan section and an annular FLADE inlet to the FLADE duct; and
a fixed geometry inlet duct extending between an air intake mounted flush with respect to the fuselage and the engine inlet.

49. An aircraft as claimed in claim 48 wherein the fan section includes only a single direction of rotation fan.

50. An aircraft as claimed in claim 48 wherein the fan section is upstream of a fan bypass duct, includes axially spaced apart first and second counter-rotatable fans, and the FLADE fan blades are drivingly connected to one of the first and second counter-rotatable fans.

51. An aircraft as claimed in claim 48 further comprising a row of variable first FLADE vanes disposed axially forwardly of the row of FLADE fan blades.

52. An aircraft as claimed in claim 51 wherein the fan section includes only a single direction of rotation fan.

53. An aircraft as claimed in claim 51 wherein the fan section is upstream of a fan bypass duct, includes axially spaced apart first and second counter-rotatable fans, and the FLADE fan blades are drivingly connected to one of the first and second counter-rotatable fans.

54. An aircraft as claimed in claim 48 further comprising the row of FLADE fan blades disposed between an axially forward row of variable first FLADE vanes and an axially aft row of second FLADE vanes.

55. An aircraft as claimed in claim 48 further comprising:
a core engine located downstream and axially aft of the fan,
a fan bypass duct located downstream and axially aft of the fan and circumscribing the core engine, and
the FLADE duct circumscribing the fan bypass duct.

56. An aircraft as claimed in claim 55 wherein the fan section includes only a single direction of rotation fan.

57. An aircraft as claimed in claim 55 wherein the fan section is upstream of the fan bypass duct, includes axially spaced apart first and second counter-rotatable fans, and the FLADE fan blades are drivingly connected to one of the first and second counter-rotatable fans.

58. An aircraft as claimed in claim 55 further comprising a row of variable first FLADE vanes disposed axially forwardly of the row of FLADE fan blades.

59. An aircraft as claimed in claim 55 further comprising the row of FLADE fan blades disposed between an axially forward row of variable first FLADE vanes and an axially aft row of second FLADE vanes.

60. An aircraft as claimed in claim 59 wherein the fan section includes only a single direction of rotation fan.

61. An aircraft as claimed in claim 48 further comprising the fixed geometry inlet duct having a two-dimensional convergent/divergent inlet duct passage with convergent and divergent sections, and a throat therebetween and a transition section between the two-dimensional convergent/divergent inlet duct passage and the engine inlet.

62. An aircraft as claimed in claim 61 wherein the fan section includes only a single direction of rotation fan.

63. An aircraft as claimed in claim 61 wherein the fan section is upstream of a fan bypass duct, includes axially spaced apart first and second counter-rotatable fans, and the FLADE fan blades are drivingly connected to one of the first and second counter-rotatable fans.

64. An aircraft as claimed in claim 61 further comprising a row of variable first FIJADE vanes disposed axially forwardly of the row of FLADE fan blades.

65. An aircraft as claimed in claim 64 wherein the fan section includes only a single direction of rotation fan.

66. An aircraft as claimed in claim 64 wherein the fan section is upstream of a fan bypass duct, includes axially spaced apart first and second counter-rotatable fans, and the FLADE fan blades are drivingly connected to one of the first and second counter-rotatable fans.

67. An aircraft as claimed an claim 61 further comprising the row of FLADE fan blades disposed between an axially forward row of variable first FLADE vanes and an axially aft row of second FLADE vanes.

68. An aircraft as claimed in claim 48 further comprising:
a variable throat area engine nozzle downstream and axially aft of the core engine,
cooling apertures in the centerbody and in a wall of the engine nozzle in fluid communication with the FLADE duct, and
afterburners aft and downstream of the low pressure turbine section.

* * * * *

UNITED STATES PATENT AND TRADEMARK OFFICE
CERTIFICATE OF CORRECTION

PATENT NO.         : 7,395,657 B2                                              Page 1 of 1
APPLICATION NO. : 10/689289
DATED              : July 8, 2008
INVENTOR(S)        : James Edward Johnson It is certified that error appears in the above-identified patent and that said Letters Patent is hereby corrected as shown below:

In column 3, after line 10 and before line 11, please add the following heading:

DETAILED DESCRIPTION OF THE INVENTION

In column 18, Claim 64, line 17, please change "FIJADE" to --FLADE--

Signed and Sealed this

Twenty-sixth Day of August, 2008

JON W. DUDAS
*Director of the United States Patent and Trademark Office*